US011182134B2

(12) United States Patent
Milojicic et al.

(10) Patent No.: US 11,182,134 B2
(45) Date of Patent: Nov. 23, 2021

(54) SELF-ADJUSTABLE END-TO-END STACK PROGRAMMING

(71) Applicant: HEWLETT PACKARD ENTERPRISE DEVELOPMENT LP, Houston, TX (US)

(72) Inventors: Dejan S. Milojicic, Palo Alto, CA (US); Mehmet Kivanc Ozonat, Palo Alto, CA (US); Sergey Serebryakov, Palo Alto, CA (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 0 days.

(21) Appl. No.: 16/799,637

(22) Filed: Feb. 24, 2020

(65) Prior Publication Data

US 2021/0263713 A1   Aug. 26, 2021

(51) Int. Cl.
  *G06F 8/35*     (2018.01)
  *G06F 9/445*    (2018.01)

(52) U.S. Cl.
  CPC ............ *G06F 8/35* (2013.01); *G06F 9/44505* (2013.01)

(58) Field of Classification Search
  CPC ................................. G06F 8/35; G06F 9/44505
  See application file for complete search history.

(56) References Cited

U.S. PATENT DOCUMENTS

| | | | | |
|---|---|---|---|---|
| 7,191,435 B2* | 3/2007 | Lau | ............................ | G06F 8/65 714/38.1 |
| 8,032,886 B2* | 10/2011 | Joy | ...................... | G06F 11/3636 718/102 |
| 8,869,098 B2* | 10/2014 | Elaasar | ...................... | G06F 8/10 717/104 |
| 8,954,309 B2* | 2/2015 | B'Far | ..................... | G06F 11/302 703/21 |
| 9,588,785 B2* | 3/2017 | McGee | ............... | G06F 9/44505 |
| 9,756,118 B2* | 9/2017 | Taheri | ..................... | H04L 43/00 |
| 9,912,517 B1* | 3/2018 | Ramalingam | ....... | G06F 9/45516 |
| 10,157,067 B2* | 12/2018 | Liu | ...................... | G06F 9/44505 |
| 10,248,527 B1* | 4/2019 | Miller | ................... | G06F 1/3206 |
| 10,521,243 B2* | 12/2019 | Cohen | ....................... | G06F 8/60 |
| 10,606,575 B2* | 3/2020 | Dorie | ............... | G06Q 10/06393 |
| 2007/0192641 A1* | 8/2007 | Nagendra | ............. | G06F 1/3203 713/320 |
| 2009/0112780 A1* | 4/2009 | Chen | ................... | G06F 9/44505 706/19 |

(Continued)

*Primary Examiner* — Douglas M Slachta
(74) *Attorney, Agent, or Firm* — Sheppard Mullin Richter & Hampton LLP

(57) ABSTRACT

Systems and methods are provided for optimizing parameters of a system across an entire stack, including algorithms layer, toolchain layer, execution or runtime layer, and hardware layer. Results from the layer-specific optimization functions of each domain can be consolidated using one or more consolidation optimization functions to consolidate the layer-specific optimization results, capturing the relationship between the different layers of the stack. Continuous monitoring of the programming model during execution may be implemented and can enable the programming model to self-adjust based on real-time performance metrics. In this way, programmers and system administrators are relieved of the need for domain knowledge and are offered a systematic way for continuous optimization (rather than an ad hoc approach).

12 Claims, 8 Drawing Sheets

(56) References Cited

U.S. PATENT DOCUMENTS

| | | | |
|---|---|---|---|
| 2011/0098973 A1* | 4/2011 | Seidman | G06F 11/3409 |
| | | | 702/179 |
| 2012/0233445 A1* | 9/2012 | Zhang | G06F 9/3859 |
| | | | 712/220 |
| 2015/0378762 A1* | 12/2015 | Saladi | H04L 41/0816 |
| | | | 718/1 |
| 2017/0168861 A1* | 6/2017 | Dhawan | G06F 9/45558 |
| 2018/0239851 A1* | 8/2018 | Ypma | G03F 9/7019 |
| 2018/0275987 A1* | 9/2018 | Vandeputte | G06F 8/71 |
| 2018/0349159 A1* | 12/2018 | Boutnaru | G06N 3/126 |

\* cited by examiner

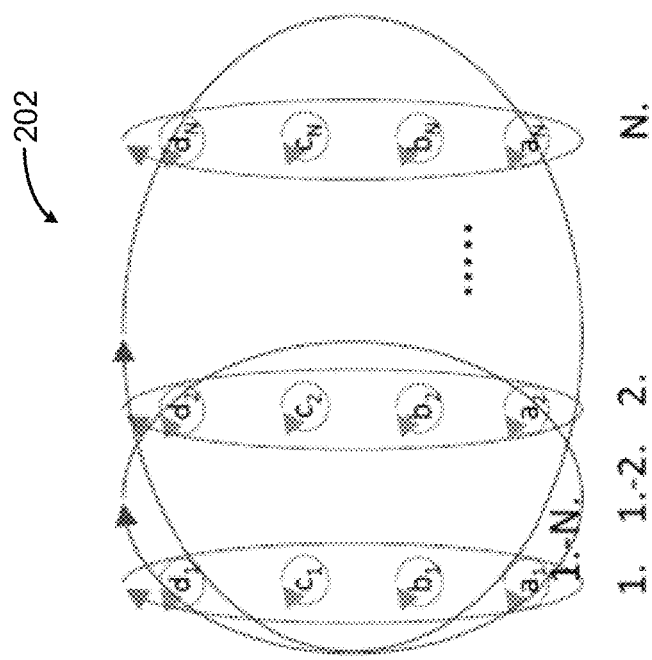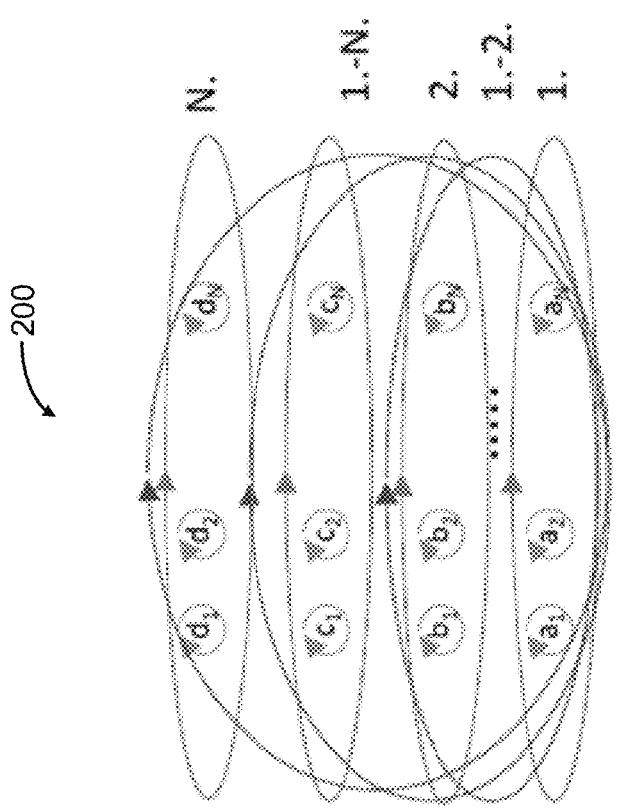
FIG. 2

SELF-ADJUSTABLE END-TO-END STACK PROGRAMMING

DESCRIPTION OF RELATED ART

Hardware architectures enhanced with accelerators, extremely large operating memories, and fast interconnects offer new opportunities for programming models, such as probabilistic and deep learning. To take advantage of these opportunities, the model can be optimized for each layer of the programming stack (e.g., algorithms, toolchains, runtime, hardware). Such optimization is immensely cumbersome and generally must be performed ad hoc and relying on heuristics concerning individual layers to make any improvements to individual layers of the stack.

BRIEF DESCRIPTION OF THE DRAWINGS

The present disclosure, in accordance with one or more various embodiments, is described in detail with reference to the following figures. The figures are provided for purposes of illustration only and merely depict typical or example embodiments.

FIG. 2 illustrates iteration of individual loops to achieve end-to-end optimization in accordance with embodiments of the technology disclosed herein.

Figure 1:
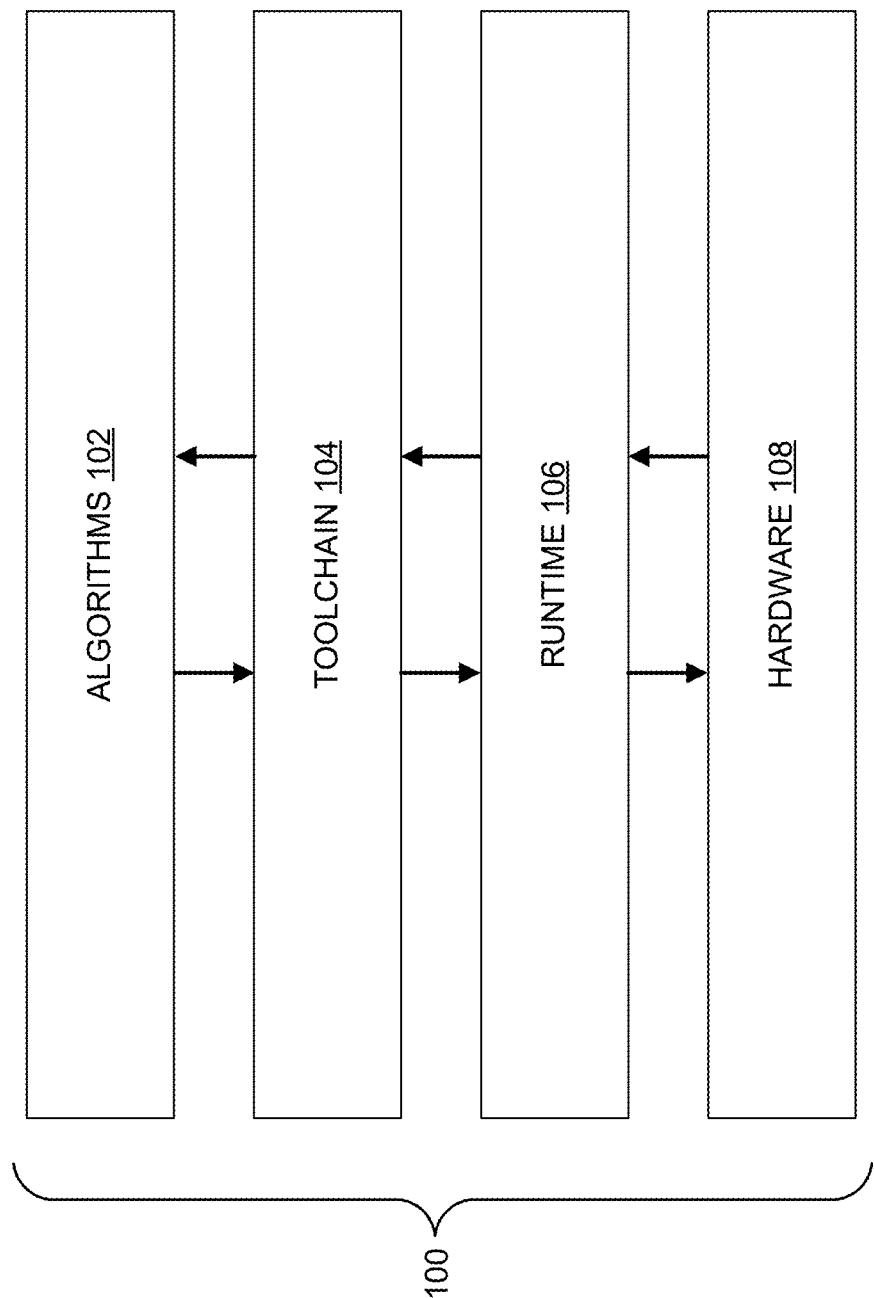
FIG. 1 illustrates an end-to-end stack of a programming model in accordance with embodiments of the technology disclosed herein.

The figures are not exhaustive and do not limit the present disclosure to the precise form disclosed.

DETAILED DESCRIPTION

Optimization of a programming model can occur at each layer of the programming stack. Each layer in an end-to-end stack requires its own deep expertise. For example, when optimizing programming code it is necessary to have the proper domain knowledge regarding coding languages. However, optimizing the toolchain (e.g., compilers, debuggers, etc.) requires different knowledge concerning how to link together different development tools across the stack. This is true at each separate layer of the stack, down to the hardware functioning within the programming model. These differences in knowledge pose a hurdle to efficient optimization of programming models across the entire stack to take advantage of the new opportunities offered by advances in accelerators, operating memories, and interconnect fabrics of the network across which the programming stack is operating.

To achieve such optimization, current approaches rely heavily on manual operation performed by individuals with expertise for a given domain. For each domain (i.e., layer) of the stack, one or more individuals with the requisite knowledge for the domain performs optimization tasks within that domain. For example, a programmer may modify the underlying code of the application within the programming model to achieve a desired behavior. Such a desired behavior, for example, can correspond with increasing portability of the underlying code by simplifying the code or minimizing the size of the total code. Another entity (e.g., a system administrator, a network engineer, etc.) may look to modify the run-time environment to better utilize available resources. Optimizing the runtime environment requires different knowledge than optimizing the code of an application itself. Although each individual may perform optimization within a given domain, each individual may not be aware of how changes within that domain would interact with the other domains. This type of closed-loop optimization fails to consider the optimal approach to the programming model across the entire stack.

Moreover, because of the interdependencies between layers of the programming stack, optimizing a programming model employs various heuristics that may not equate to the most optimal approach for a given domain. Some approaches may require an unconventional configuration within a given domain (e.g., toolchain) to ensure that the end-to-end programming model is operating at its optimal level. This is not a task that can be efficiently accomplished under the ad hoc approaches currently employed.

The system and method disclosed herein reduces the cumbersome nature and inefficiency of traditional programming model optimization approaches across the entire stack. The improvements may be implemented concurrently across the entire stack. Embodiments of the present disclosure provide a self-adjustable, systematic approach for end-to-end programming model optimization that avoids the need for ad hoc implementation. Each layer of the stack is configured to achieve overall optimal plasticity in the model, enabling the programming model to be more easily adapted to a near-optimal state. At each layer, individual optimization loops are performed for each of a plurality of plasticity variables associated with an optimal desired performance of the programming model.

Results from the layer-specific optimization functions of each domain can be consolidated using one or more consolidation optimization functions to consolidate the layer-specific optimization results, capturing the relationship between the different layers of the stack. In various embodiments, the layer-specific and consolidation optimization loops can be performed with respect to each layer or each plasticity variable.

Continuous monitoring of the programming model during runtime may be implemented. The continuous monitoring can enable the programming model to self-adjust based on real-time performance metrics. In this way, programmers and system administrators are relieved of the need for domain knowledge and are offered a systematic way for continuous optimization (rather than an ad hoc approach).

It should be noted that the terms "optimize," "optimal," and the like as used herein can be used to mean making or achieving performance as effective or perfect as possible. However, as one of ordinary skill in the art reading this document will recognize, perfection cannot always be achieved. Accordingly, these terms can also encompass making or achieving performance as good or effective as possible or practical under the given circumstances, or making or achieving performance better than that which can be achieved with other settings or parameters.

FIG. 1 illustrates an example programming model stack 100 in accordance with embodiments of the technology disclosed herein. Stack 100 is provided for illustrative purposes only and should not be interpreted as limiting the scope of the technology to only the depicted embodiment. In various embodiments, stack 100 may include a greater or lesser number of layers than those identified, based on how the layers of a stack are defined in a given implementation. For ease of discussion, the technology disclosed herein shall be discussed with respect to the layers of the programming model stack 100 depicted in FIG. 1.

Example stack 100 comprises four layers: algorithms layer 102, toolchain layer 104, runtime layer 106, and hardware layer 108. The algorithms, toolchain, runtime, and hardware layers may correspond with domains, layers, and/or levels of abstraction interchangeably. Domains can be mapped to layers or levels of abstraction, but they do not need to, it all depends on specific examples. As such, one of ordinary skill in the art reading this document will recognize that these terms can be used interchangeably.

Algorithms layer 102 may include application code underlying the programming model. In various embodiments, one or more applications may be present within algorithms layer 102, each configured to provide a different functionality to the overall programming model. Optimization can be configured on an application-by-application manner in some embodiments, while in other embodiments the optimization of the programming model across stack 100 may be performed on multiple applications of the programming model simultaneously. Algorithms layer 102 can refer to the high-level architecture for the programming model, where a programmer is capable of creating the underlying code to support applications functions.

Toolchain layer 104 may include a set of specific software development tools used to enable the application code of algorithms layer 102 to be translated into executable code. Toolchain layer 104 defines how the different development tools are linked together to take the underlying programming code and create binary code suitable for execution by one or more computing components. Tools of toolchain layer 104 include, but are not limited to, debuggers, compilers, and code libraries, among others. In some examples, toolchain layer 104 may include different neural networks, different software components and different languages and platforms, such as Python, Tensorflow, etc.

In case of a heterogeneous hardware environment that includes different compute devices (like CPUs/GPUs/TPUs/FPGAs etc), toolchain layer 104 may be configured to generate code specific for each of these devices. Some tool chains may be configured to decide on what available accelerator each programming function should be run in order to achieve a near-optimal performance. Selection of a corresponding accelerator may be influenced not only by a capability of this accelerator, but also by availability of algorithms layer 102 that can take advantage of this accelerator and by the "distance" between accelerators (e.g., how expensive it is to transfer data to/from accelerator memory).

Runtime layer 106 may include the environment in which the executable code is run on a system. The runtime environment of runtime layer 106 may define the memory layout for a given application (e.g., virtual memory addressing), how applications access variables or objects (e.g., pointers), how configuration parameters or values are passed between different calls or processes of the application, and how the application interfaces with the operating system of the computing device, among other execution-related parameters. In some examples, runtime layer 106 can also correspond with different resolution and precision (for approximate solutions).

Hardware layer 108 includes the environment associated with physical objects of the system. The runtime environment of hardware layer 108 may comprise one or more central processing units (CPU), graphics processing unit (GPU), tensor processing unit (TPU) corresponding with an AI accelerator application-specific integrated circuit (ASIC) for neural network machine learning, dot product engine (DPE) corresponding with a particular type of processing unit developed for some computing systems, etc.

Parameters may correspond with performance data measured by the computing component of the system and also correspond with one or more layers in stack 100. Parameters can include configuration parameters that correspond with values of, for example, power utilization, power drawing, memory usage, utilization efficiency, and temperature sensor readings of the computing component. The parameter values may be compared with various thresholds (e.g., related to power utilization, power drawing, memory usage, utilization efficiency, temperature sensor readings, etc.). When a parameter value exceeds a threshold, the parameter value may correspond with a potential issue with the system that can be adjusted to allow the system to run at a greater optimization.

Each parameter may correspond with a different value at each layer. For example, at algorithm layer 102, high level programming languages such as C++ or Java may be implemented for developing applications. At runtime layer 106 or hardware layer 108, machine-specific instructions may be utilized. Thus, a pipelining factor can correspond with different aspects at these layers. In another example, at hardware layer 108, the parameters may be limited by a hardware design or technical requirements and may not be able to have enough chip space or energy budgets to support deep pipelining for instructions. In another example, at algorithms layer 102, the parameters may be limited to some extent by an application logic, where deep pipelining may not be required, if required at all. For instance, if there are two "equal" components (e.g., in terms of processing times) that are processing input data sequentially, a pipelining factor greater than two or three (depending of precise definition of a pipelining factor) might not make sense.

Additionally, depending on the layer, the plasticity factor may be adjusted. For example, a precision at algorithm layer 102 could allow for various adjustments (e.g., 10× to 1×). At toolchain layer 104 and runtime layer 106, the precision may be reduced for practical purposes (e.g., 5× to 1×). In some examples, precision may be reduced or increased, but not both directions.

Various plasticity factors may be implemented across stack 100, including for example, pipelining, precision, security, locking, efficiency, and synchronization. Plasticity may refer to the ability to dynamically (e.g., at execution time or at the definition/compilation time, etc.) change different components in terms of parameters, size, scope, etc. The plasticity factors can refer to characteristics of the system and adjustments made to these characteristics in order to affect operation of the system, including for example, more security, less security, simpler pipelining, more complex pipelining, and the like. Different layers may have different priorities, preferences, or weights for the plasticity factors based on the features of each layer in order to achieve optimization. For example, algorithms layer 102 may not support security or locking plasticity factors but may be well suited for pipelining or precision plasticity factors. Values associated with the pipelining or precision plasticity factors within algorithms layer 102 may be adjusted to achieve a greater optimization of system resources.

The pipelining factor of the plasticity factors comprises successive steps of an instruction sequence or other software code that may be executed in turn by a sequence of modules able to operate concurrently, so that another instruction can begin before the previous one is finished. In some examples, while one stage of an instruction is being processed (e.g., the fetch stage, the decode stage, and the execute stage, etc.), other instructions may be undergoing processing at a different stage. Without a pipeline, each instruction would have to wait for the previous one to finish before it could even be accessed. By implementing the pipelining factor on hardware layer 108, for example, performance can be improved by overlapping execution or reconfiguring one or more hardware components in hardware layer 108.

The precision factor of the plasticity factors comprises analyzing the instruction sequence or other software code to determine portions of the code that can be removed. Once the code has been analyzed, precision adjustments may be implemented to adjust algorithm precision. For example, the system can incorporate weights that can be adjusted or removed based on dynamic analysis. In another example, the precision factor can correspond with storing FP16 (half precision) data compared to higher precision FP32 or FP64 to reduce memory usage of a neural network. In another example, the precision factor can correspond with 16-bit floating point data ("half" or FP16) and 8- and 16-bit integer data (INT8 and INT16). The system may drop certain bits at various layers, or adjust weights, actuation, or partial sums. With the adjustment of the precision factor, the precision may be minimally reduced but the code size may be reduce substantially.

In some examples, multiple analysis techniques may be implemented to adjust the precision factor. For example, an execution time technique could be using reinforcement learning, where different reconfigurable plasticity parameters could be evaluated. These techniques may correspond with part of the learning of different components of the algorithm (e.g., drop parts of the code at the runtime), of the layers of neural network (e.g., dropping whole layer), or even hardware (e.g., deactivating certain crossbars). At the same time, precision of the data and its encoding could be changed at all levels, e.g. at the algorithm level we can support all precisions, at the toolchain level, runtime, and even at the hardware. Or certain level may or may not have that flexibility, but other layers may apply adjustments.

In some examples, a precision analyzer can compare results of computations with expected outcome, and simplify the computation chain by removing some of the components until the "difference" between actual and expected numbers becomes too large (e.g., above certain threshold).

The security factor of the plasticity factors comprises adjusting data security factors to allow or prevent data access. For example, the system can encrypt at least a portion of the data stored in memory and then decrypt the data during execution within hardware layer 108. The system may be aware of the security factor or the process may be implemented transparently at the runtime level.

The locking factor of the plasticity factors comprises implementing exclusive access or read-only access to portions of the system. In some examples, a lock free algorithm may be implemented. Different types of locking may be required for different components, which could be exclusive or read-only, etc. Similar or more or less restricting approaches can be applied across the layers.

The efficiency factor of the plasticity factors comprises adjusting the speed and/or decreasing the steps required to progress an action. For example to achieve higher efficiency, the precision could be reduced. This could be accomplished at different layers to reach the (near-)optimal choice.

The synchronization factor of the plasticity factors comprises altering or analyzing processes in the system to correspond with a same time (e.g., concurrency). In some examples, the synchronization factor may be somewhat related to the locking factor, but the data could be strictly synchronized or certain amount of overlap could be achieved using techniques such as pipelining.

One or more of the plasticity factors may be implemented in accordance with ordering of the plasticity factors. The order of the plasticity factors may be determined by executing an iterative control loop mechanism of individual loops at one or more layers on a per-level basis or a per-parameter basis. The retrieved plurality of performance data may be analyzed at each iterative loop in order to determine whether the performance data can be improved to reach the optimization state (e.g., for each layer, or for the system overall). Examples of executing the iterative control loop mechanism of individual loops is illustrated in FIG. 2.

At 200, one or more plasticity factors can be implemented at each layer, including algorithms layer 102, toolchain layer 104, runtime layer 106, and hardware layer 108, illustrated in reversed order (bottom to top) as d, c, b, and a in FIG. 2, respectively. Upon implementation, the computing component of the system may access the plasticity factors for algorithms layer 102, for example the pipelining factor and the precision factor, and determine when an optimization state is achieved corresponding with the parameters of these plasticity factors, for example memory usage and utilization efficiency. The determination of achieving the optimization state may be performed iteratively one by one, or concurrently at the same time. Once the optimization state is achieved for the individual plasticity factors, the computing component of the system may repeat the determination of the optimization state across all plasticity factors for algorithms layer 102 so that the configuration parameters corresponding with this layer are optimized. Then, the next layer is identified, for example toolchain layer 104, and the parameters corresponding with these the plasticity factors, for example power utilization and power drawing, may be optimized. The computing component of the system may run one or more optimization functions to consolidate optimization results from different layers. One or more of these layers may be optimized individually in terms of performance metrics (a scalar number of a vector of values). When combined, the performance metrics associated with the optimization process across all layers may effectively consolidate impact across these layers until there is end-to-end optimization.

In another example, at 202, one or more plasticity factors can be implemented for a single parameter, illustrated as a1, b1, c1, d1 for a first parameter at each layer, a2, b2, c2, d2 for a second parameter at each layer, and so on. As an illustrative example, power utilization may be optimized by the pipelining factor for algorithms layer 102, toolchain layer 104, runtime layer 106, and hardware layer 108, and then power utilization may be optimized by the precision factor for algorithms layer 102, toolchain layer 104, runtime layer 106, and hardware layer 108, and so on until additional parameters and factors are considered, including the power drawing may be optimized for algorithms layer 102, toolchain layer 104, runtime layer 106, and hardware layer 108, and so on. Once the one or more plasticity factors are implemented for a single parameter at a first layer, for example algorithms layer 102, the one or more plasticity factors can be implemented for the same parameter at the other layers, for example toolchain layer 104, runtime layer 106, and hardware layer 108.

The order of applying the one or more plasticity factors to the configuration parameters may be altered based on dependency of each of the parameters. For example, a dependency definition may be identified across parameters and/or layers. The one or more plasticity factors can be applied to a root parameter (e.g., with no dependencies) and the order of the next parameter to be optimized may be chosen based on dependencies of other parameters to the root parameter (e.g., a parameter with a direct reliance on the root parameter). In some examples, the parameters may be determined based on organization of the parameters in a search tree data structure such that the one or more plasticity factors are applied to the root parameter identified by the search tree data structure and the process may iteratively determine children of the root parameter to identify the next parameter to apply optimization techniques to each of the relevant plasticity factors.

In some examples, the iteration of individual loops at one or more layers can be continuously verified across stack 100. For example, the verification may determine whether the optimization threshold value has been reached. In another example, the value of the cost function may keep decreasing.

The computing component of the system iterates throughout the layers, for example, by consolidating the parameters and layers until the algorithm is determined to have been optimized. For example, the optimization may be reached at each individual level. The process may attempt to achieve more than simple sum of optimizations by adjusting plasticity factors across multiple layers for better performance than that simple performance level of individual optimizations, which may meet or exceed a threshold performance value.

In some examples, the optimization may be reached by receiving indications of failures of a specific parameter or layer falling below a threshold failure value. For example, when one layer can have lower performance compared to best individual performance, overall performance can be better.

Figure 3:
FIG. 3 illustrates a weighted vector for specific types of parameters throughout the layers in accordance with embodiments of the technology disclosed herein.

FIG. 3 illustrates a weighted vector for specific types of parameters throughout the layers in accordance with embodiments of the technology disclosed herein. In illustration 300, each layer 302 of stack 100 is provided. One or more weights may be applied for each layer corresponding to a plasticity factor 304 (e.g., pipelining, precision, security, locking, efficiency, synchronization, etc.) and/or parameter 306. In some examples, each vector element can represent a weight 308 corresponding to the plasticity factor 304, where a higher weight implies a higher priority on the corresponding plasticity factor. The weights may correspond with non-negative values and the sum of the weights may equal one (e.g., for a particular parameter across the stack, etc.).

Figure 4:
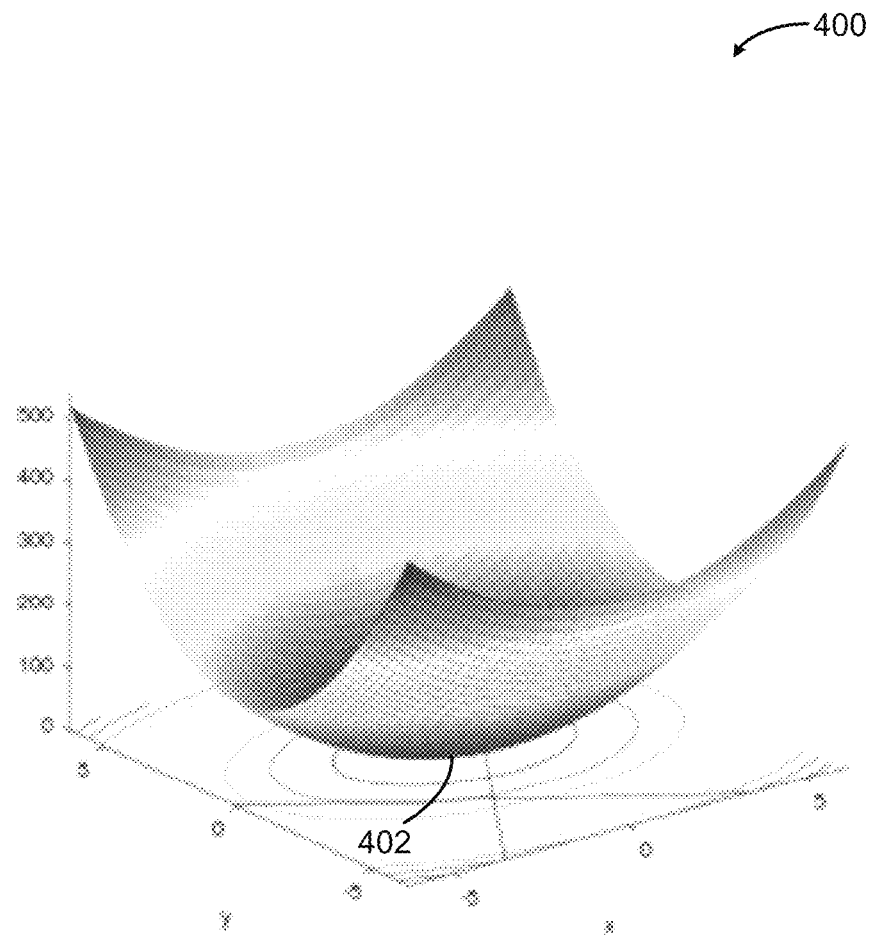
FIG. 4 provides an illustrative sample self-adjusting cost function in accordance with embodiments of the technology disclosed herein.

An illustrative self-adjusting cost function 400 is provided with FIG. 4, where the minimization of the cost function may converge on a local minimum 402. The self-adjusting cost function may be executed. In some examples, a different cost function may be provided for each layer of stack 100 (e.g., four cost functions) and/or a single cost function may be applied for stack 100 (e.g., one or five cost functions). Using the one or more self-adjusting cost functions, the computing component of the system may be able to adjust on the fly to help optimize performance.

The cost function may incorporate the sum of the weight vector and values, as provided with illustration 300, multiplied with a Lagrangian parameter, and an objective function of the probabilistic programming or deep learning problem that the self-adjusting system is solving. In some examples, the self-adjusting cost function can improve the cost function or objective function of the mathematical problem (e.g., probabilistic programming or deep learning) to include the plasticity factors parameters within a Lagrangian formulation.

The self-adjusting cost function may be minimized using gradient descent, Markov-chain Monte Carlo (MCMC), linear or quadratic programming, reinforcement learning or other techniques in machine learning, artificial intelligence, or genetic algorithms.

In some examples, the self-adjusting cost function may be minimized using an iterative, gradient-descent solution. For example, gradient descent may correspond with a first-order iterative optimization algorithm for finding the local minimum of the cost function. To find a local minimum of the cost function using gradient descent, the system may take steps proportional to the negative of the gradient of the cost function at the current point until an optimized value is determined.

In some examples, the self-adjusting cost function is minimized using a Markov-chain Monte Carlo (MCMC) solution. The MCMC solution can create samples from a continuous random variable with probability density proportional to a known function. These samples can be used to evaluate an integral over that variable as its expected value or variance until an optimized value is determined.

In some examples, the self-adjusting cost function is minimized using linear or non-linear (e.g., quadratic) programming. The self-adjusting cost function may be optimized using a quadratic function of several variables subject to linear constraints on these variables.

In some examples, the self-adjusting cost function is minimized using machine learning or artificial intelligence. In some examples, the self-adjusting cost-function is minimized using Reinforcement Learning (RL). For example, an optimal behavior of systems like drones or self-driving cars depend on how they interact with environment (a behavior policy), and this behavior is optimized using RL methods by selecting values of plasticity parameters that result in a behavior with smaller cost function.

In some examples, the self-adjusting cost function is minimized using Genetic Algorithms. Initially, some number of populations are generated randomly where each population is a collection of one or more plasticity factors. Each population is evaluated according to a cost function and best N populations are selected. Using these N populations, M new populations are generated by randomly changing some parameters, or randomly combining parameters from different populations. These N plus M populations are evaluated again and iteration continues until a population found with acceptable value of a cost function.

Figure 5:
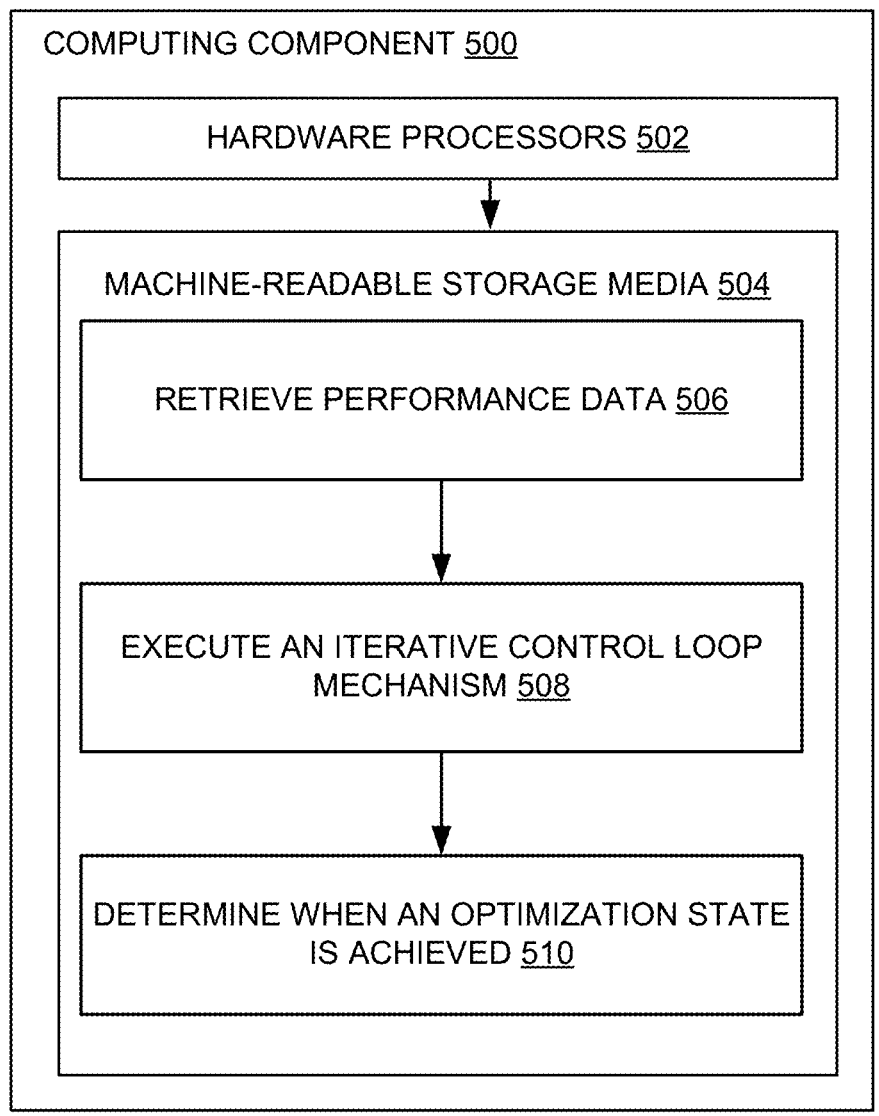
FIG. 5 illustrates an example iterative process performed by a computing component for optimizing a system during run-time.

FIG. 5 illustrates an example iterative process performed by a computing component 500 for optimizing the system during run-time. Computing component 500 may be, for example, a server computer, a controller, or any other similar computing component capable of processing data. In the example implementation of FIG. 5, the computing component 500 includes a hardware processor 502, and machine-readable storage medium 504. In some embodiments, computing component 500 may be an embodiment of a system corresponding with stack 100 of FIG. 1.

Hardware processor 502 may be one or more central processing units (CPUs), semiconductor-based microprocessors, and/or other hardware devices suitable for retrieval and execution of instructions stored in machine-readable storage medium 504. Hardware processor 502 may fetch, decode, and execute instructions, such as instructions 506-510, to control processes or operations for optimizing the system during run-time. As an alternative or in addition to retrieving and executing instructions, hardware processor 502 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 504, may be any electronic, magnetic, optical, or other physical storage device that contains or stores executable instructions. Thus, machine-readable storage medium 504 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 504 may be a non-transitory storage medium, where the term "non-transitory" does not encompass transitory propagating signals. As described in detail below, machine-readable storage medium 504 may be encoded with executable instructions, for example, instructions 506-510.

Hardware processor 502 may execute instruction 506 to retrieve performance data. For example, the computing component of the system may retrieve a plurality of performance data associated with the system running a programming model. The programming model may correspond with a stack comprising a plurality of layers, including an algorithms layer, a toolchain layer, a runtime layer, and a hardware layer.

Hardware processor 502 may execute instruction 508 to execute an iterative control loop mechanism using the retrieved plurality of performance data.

Hardware processor 502 may execute instruction 510 to determine when an optimization state is achieved. For example, the optimization state may be achieved based on the results of the iterative control loop mechanism. In some examples, executing the iterative control loop mechanism comprises running one or more layer-specific optimization functions at each layer of a plurality of hierarchical layers comprising the system. In some examples, one or more consolidation optimization functions may be run to consolidate optimization results from different layers.

Figure 6:
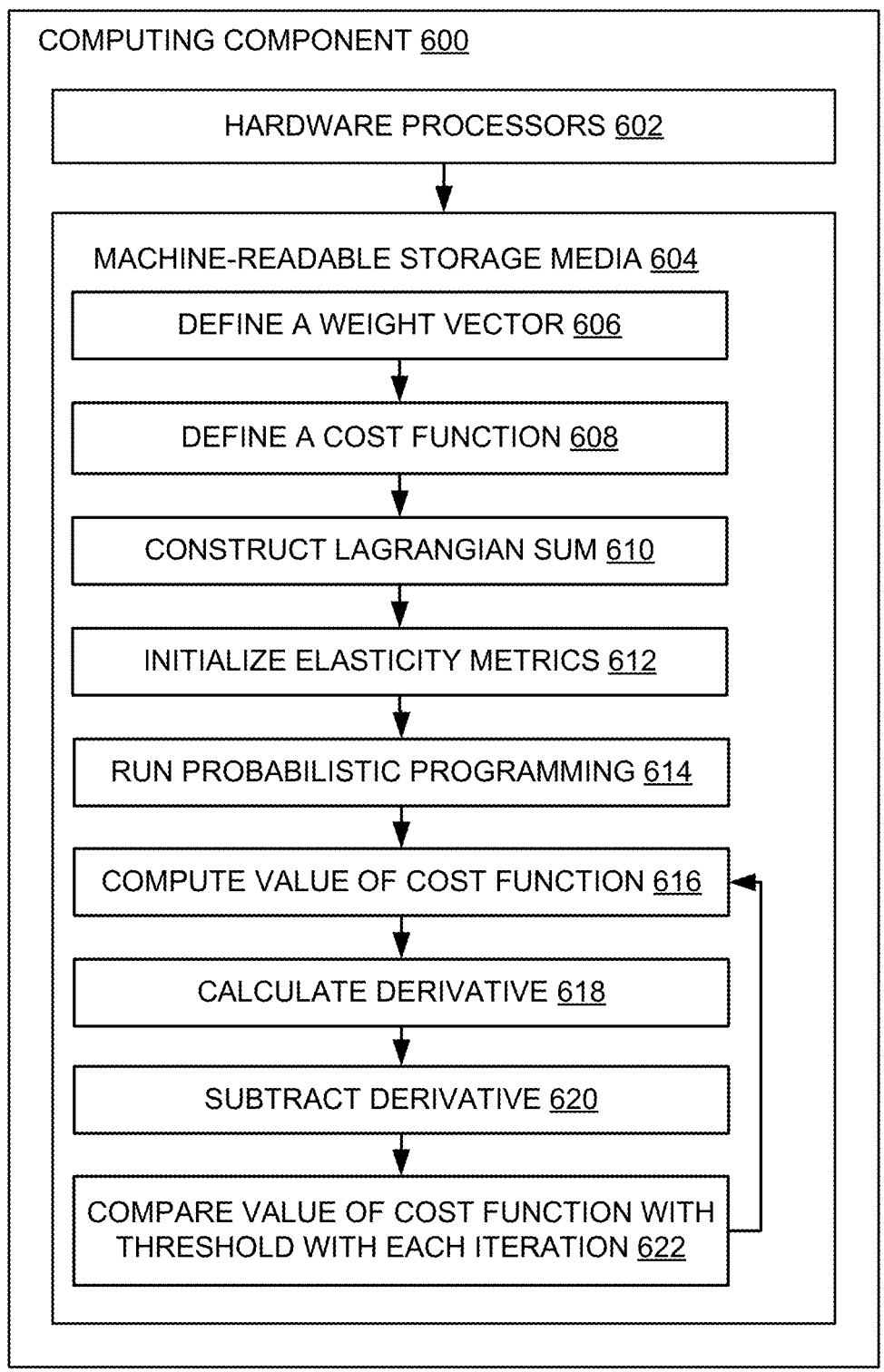
FIG. 6 illustrates an example iterative process performed by a computing component for optimizing a system during run-time.

FIG. 6 illustrates an example iterative process performed by a computing component 600 for optimizing the system during run-time. Computing component 600 may be, for example, a server computer, a controller, or any other similar computing component capable of processing data. In the example implementation of FIG. 6, the computing component 600 includes a hardware processor 602, and machine-readable storage medium 604. In some embodiments, computing component 600 may be an embodiment of a system corresponding with stack 100 of FIG. 1.

Hardware processor 602 may be one or more central processing units (CPUs), semiconductor-based microprocessors, and/or other hardware devices suitable for retrieval and execution of instructions stored in machine-readable storage medium 604. Hardware processor 602 may fetch, decode, and execute instructions, such as instructions 606-622, to control processes or operations for optimizing the system during run-time. As an alternative or in addition to retrieving and executing instructions, hardware processor 602 may include one or more electronic circuits that include electronic components for performing the functionality of one or more instructions, such as a field programmable gate array (FPGA), application specific integrated circuit (ASIC), or other electronic circuits.

A machine-readable storage medium, such as machine-readable storage medium 604, may be any electronic, magnetic, optical, or other physical storage device that contains or stores executable instructions. Thus, machine-readable storage medium 604 may be, for example, Random Access Memory (RAM), non-volatile RAM (NVRAM), an Electrically Erasable Programmable Read-Only Memory (EEPROM), a storage device, an optical disc, and the like. In some embodiments, machine-readable storage medium 604 may be a non-transitory storage medium, where the term "non-transitory" does not encompass transitory propagating signals. As described in detail below, machine-readable storage medium 604 may be encoded with executable instructions, for example, instructions 606-622.

Hardware processor 602 may execute instruction 606 to define a weight vector. For example, the weight vector may be defined for the plasticity parameters.

Hardware processor 602 may execute instruction 608 to define a cost function. For example, the cost function may be defined for the probabilistic programming problem.

Hardware processor 602 may execute instruction 610 to construct the cost function. For example, the cost function may be constructed as a Lagrangian sum of the weight vector and the probabilistic programming cost function.

Hardware processor 602 may execute instruction 612 to initialize settings for the elasticity metrics.

Hardware processor 602 may execute instruction 614 to execute the probabilistic programming. For example, the computing component of the system may run the probabilistic programming under the metric settings with the number of training samples and the number of parameters are representative subsets of a larger problem or they represent a class of problems.

Hardware processor 602 may execute instruction 616 to compute the value of the cost function.

Hardware processor 602 may execute instruction 618 to calculate the derivative of the cost function. For example, the computing component of the system may calculate the derivative of the cost function evaluated at the current metric settings.

Hardware processor 602 may execute instruction 620 to subtract the derivative of the cost function from the metric settings values. In some examples, the weighted version of the derivative of the cost function may be subtracted from the metric setting values.

Hardware processor 602 may execute instruction 622 to compare the value of the cost function from block 616 with a threshold. If the change in the value of the cost function from one iteration to the next is below the threshold, the algorithm is declared to converge to an optimized value.

Figure 7:
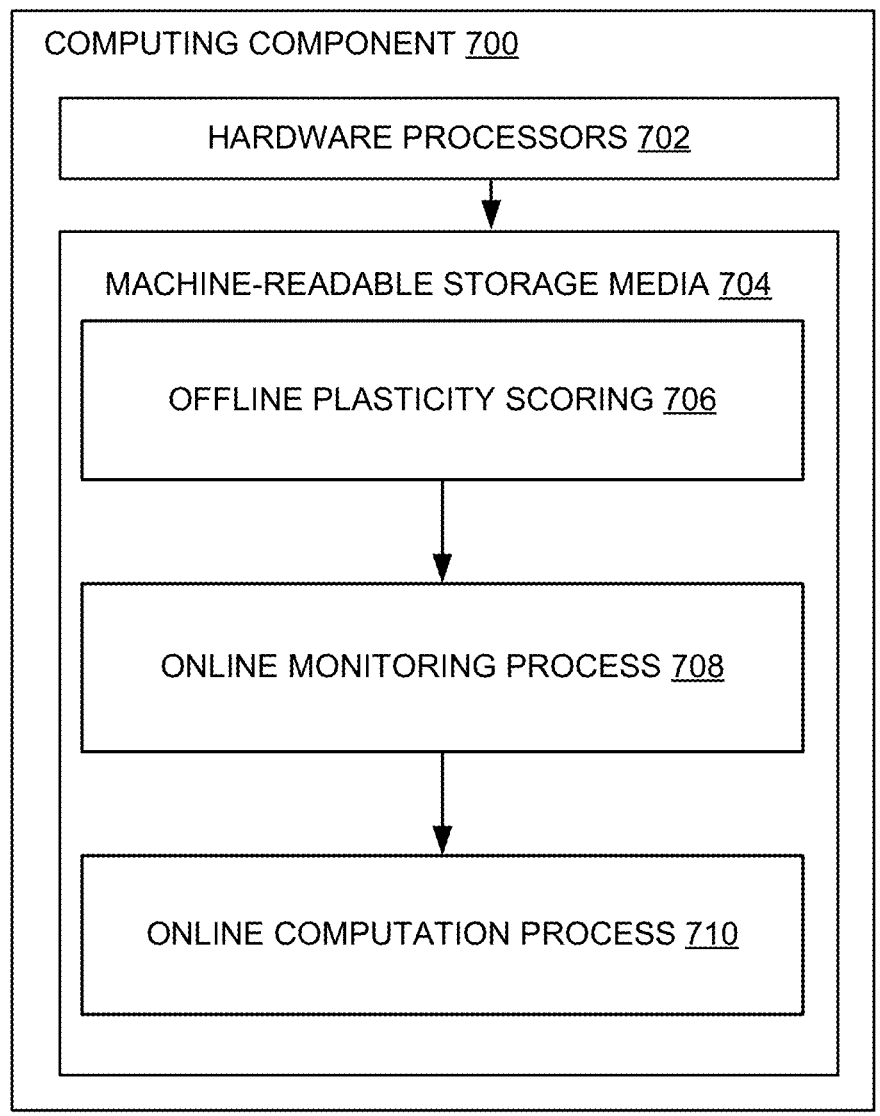
FIG. 7 illustrates a computing component for performing a profiling and scoring processes.

FIG. 7 illustrates a computing component for performing a profiling and scoring processes. The computing component 700, hardware processors 702, and machine-readable storage medium 704 may correspond with computing component 500, hardware processors 502, and machine-readable storage medium 504 of FIG. 5 or may correspond with computing component 600, hardware processors 602, and machine-readable storage medium 604 of FIG. 6.

The profiling and scoring process may determine static, initial values of plasticity parameters as well as monitor and record the dynamic behavior of the execution. For example, the profiling and scoring process may be implemented as a first offline plasticity scoring process 706, a second online monitoring process 708, and a third online computation process 710.

Offline scoring 706 may be implemented by receiving input to one or more analytical models. The analytical models may include specifications of a runtime and one or more concrete applications at algorithms layer 102. For example, a neural network training may involve analytical models that can take into account not only parameters such as memory size or processor frequency (at hardware layer 108), but also can use algorithm or its simplified implementation or its digital twin (a model). The process may need to know how much time it takes to compute its output given particular runtime and hardware characteristics. For this case, the model built may predict time given hardware parameters, so that answers may be determined with certain level of accuracy without executing the neural network on actual hardware (e.g., offline analytical models). In some examples, the analytical models may evaluate and/or predict expected plasticity scores for various configurations. In addition, analytical models can be coupled with historical data (records of past runs with observed plasticity scores) to improve performance. Configurations resulting in highest scores are later improved online by profiling the actual execution and by adjusting parameters to maximize plasticity metrics.

The plasticity parameters may be monitored online through an online monitoring process 708. The monitoring process may retrieve low-level runtime parameters, such as power drawing or utilization efficiency and report them back to the computing component of the system. In some examples, the low-level runtime parameters may be stored in a data store for further analysis.

In one possible implementation, a monitoring tool may be implemented as a running process that constantly records parameters associated with metrics values being part of a vector of plasticity parameters. Each record has an associated time step that is used to retrieve intervals of measurements associated with particular execution phase of a process under optimization.

In another possible implementation, an optimization algorithm may start monitoring processes on its own whenever it runs a particular phase of a process under optimization. For example, the optimization algorithm can encrypt all data and decrypt it during execution within hardware layer 108. The optimization algorithm can be aware of this or it could be done transparently at runtime level 106. In some examples, the monitoring process may implement Inter Process Communication (IPC) to communicate with monitoring processes and retrieve data. The monitoring process may use mechanisms of an operating system to allow the processes to manage shared data. The monitoring process is either synchronous or asynchronous. For example, synchronization primitives may be used to have synchronous behavior with an asynchronous IPC mechanism.

Plasticity parameters may be monitored explicitly or implicitly. Implicit monitoring requires some form of support from targets being monitored—either individual hardware or software components. One typical example is the power drawing measurements that usually require hardware support (physical sensors) along with firmware and drivers. Explicit monitoring is based on observing other parameters and then computing/estimating value of a monitoring target using analytical models. Monitoring tool reports back to optimization process which of the plasticity parameters are monitored implicitly/explicitly and based on this, a decision can be made (by a subject matter expert or automatically based on prior plasticity preferences), whether a vector of plasticity parameters needs to be adjusted to a runtime environment. In a corner case, optimization process may abort due to inability to optimize plasticity preferences due to lack of a feedback from runtime.

In one possible implementation, a monitoring function may be reporting back metric values associated with each plasticity parameter leaving to an optimization process a responsibility to combine them into a single high level metric. In other possible implementation, an advanced monitoring function implementation may be used that reports back a single end-to-end value combining individual plasticity parameters using their weights (e.g. weighted linear combination).

Plasticity parameters are also monitored online using the computation process 710. The computation process may correspond with the main process that performs optimization of the stack. In some examples, the computation process may be configured to retrieve parameters being monitored and compute plasticity metrics.

Figure 8:
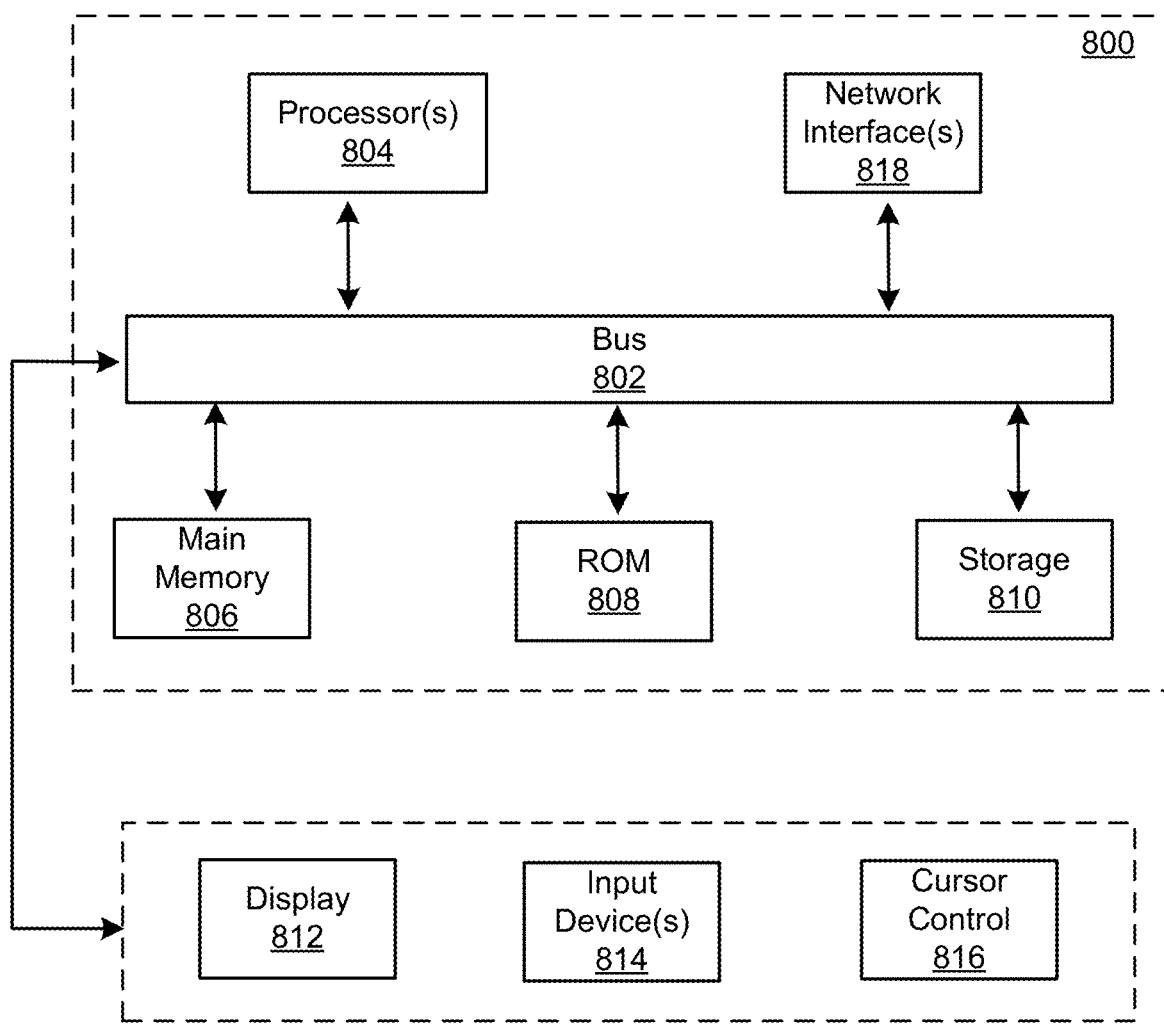
FIG. 8 is an example computing component that may be used to implement various features of embodiments described in the present disclosure.

FIG. 8 depicts a block diagram of an example computer system 800 in which various of the embodiments described herein may be implemented. The computer system 800 includes a bus 802 or other communication mechanism for communicating information, one or more hardware processors 804 coupled with bus 802 for processing information. Hardware processor(s) 804 may be, for example, one or more general purpose microprocessors.

The computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

The computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

The computer system 800 may be coupled via bus 802 to a display 812, such as a liquid crystal display (LCD) (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. In some embodiments, the same direction information and command selections as cursor control may be implemented via receiving touches on a touch screen without a cursor.

The computing system 800 may include a user interface module to implement a GUI that may be stored in a mass storage device as executable software codes that are executed by the computing device(s). This and other modules may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables.

In general, the word "component," "engine," "system," "database," data store," and the like, as used herein, can refer to logic embodied in hardware or firmware, or to a collection of software instructions, possibly having entry and exit points, written in a programming language, such as, for example, Java, C or C++. A software component may be compiled and linked into an executable program, installed in a dynamic link library, or may be written in an interpreted programming language such as, for example, BASIC, Perl, or Python. It will be appreciated that software components may be callable from other components or from themselves, and/or may be invoked in response to detected events or interrupts. Software components configured for execution on computing devices may be provided on a computer readable medium, such as a compact disc, digital video disc, flash drive, magnetic disc, or any other tangible medium, or as a digital download (and may be originally stored in a compressed or installable format that requires installation, decompression or decryption prior to execution). Such software code may be stored, partially or fully, on a memory device of the executing computing device, for execution by the computing device. Software instructions may be embedded in firmware, such as an EPROM. It will be further appreciated that hardware components may be comprised of connected logic units, such as gates and flip-flops, and/or may be comprised of programmable units, such as programmable gate arrays or processors.

The computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions.

The term "non-transitory media," and similar terms, as used herein refers to any media that store data and/or instructions that cause a machine to operate in a specific fashion. Such non-transitory media may comprise non-volatile media and/or volatile media. Non-volatile media includes, for example, optical or magnetic disks, such as storage device 810. Volatile media includes dynamic memory, such as main memory 806. Common forms of non-transitory media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge, and networked versions of the same.

Non-transitory media is distinct from but may be used in conjunction with transmission media. Transmission media participates in transferring information between non-transitory media. For example, transmission media includes coaxial cables, copper wire and fiber optics, including the wires that comprise bus 802. Transmission media can also take the form of acoustic or light waves, such as those generated during radio-wave and infra-red data communications.

The computer system 800 also includes a network interface 818 coupled to bus 802. Network interface 818 provides a two-way data communication coupling to one or more network links that are connected to one or more local networks. For example, network interface 818 may be an integrated services digital network (ISDN) card, cable modem, satellite modem, or a modem to provide a data communication connection to a corresponding type of telephone line. As another example, network interface 818 may be a local area network (LAN) card to provide a data communication connection to a compatible LAN (or WAN component to communicated with a WAN). Wireless links may also be implemented. In any such implementation, network interface 818 sends and receives electrical, electromagnetic or optical signals that carry digital data streams representing various types of information.

A network link typically provides data communication through one or more networks to other data devices. For example, a network link may provide a connection through local network to a host computer or to data equipment operated by an Internet Service Provider (ISP). The ISP in turn provides data communication services through the world wide packet data communication network now commonly referred to as the "Internet." Local network and Internet both use electrical, electromagnetic or optical signals that carry digital data streams. The signals through the various networks and the signals on network link and through network interface 818, which carry the digital data to and from computer system 800, are example forms of transmission media.

The computer system 800 can send messages and receive data, including program code, through the network(s), network link and network interface 818. In the Internet example, a server might transmit a requested code for an application program through the Internet, the ISP, the local network and the network interface 818.

The received code may be executed by processor 804 as it is received, and/or stored in storage device 810, or other non-volatile storage for later execution.

Each of the processes, methods, and algorithms described in the preceding sections may be embodied in, and fully or partially automated by, code components executed by one or more computer systems or computer processors comprising computer hardware. The one or more computer systems or computer processors may also operate to support performance of the relevant operations in a "cloud computing" environment or as a "software as a service" (SaaS). The processes and algorithms may be implemented partially or wholly in application-specific circuitry. The various features and processes described above may be used independently of one another, or may be combined in various ways. Different combinations and sub-combinations are intended to fall within the scope of this disclosure, and certain method or process blocks may be omitted in some implementations. The methods and processes described herein are also not limited to any particular sequence, and the blocks or states relating thereto can be performed in other sequences that are appropriate, or may be performed in parallel, or in some other manner. Blocks or states may be added to or removed from the disclosed example embodiments. The performance of certain of the operations or processes may be distributed among computer systems or computers processors, not only residing within a single machine, but deployed across a number of machines.

As used herein, a circuit might be implemented utilizing any form of hardware, software, or a combination thereof. For example, one or more processors, controllers, ASICs, PLAs, PALs, CPLDs, FPGAs, logical components, software routines or other mechanisms might be implemented to make up a circuit. In implementation, the various circuits described herein might be implemented as discrete circuits or the functions and features described can be shared in part or in total among one or more circuits. Even though various features or elements of functionality may be individually described or claimed as separate circuits, these features and functionality can be shared among one or more common circuits, and such description shall not require or imply that separate circuits are required to implement such features or functionality. Where a circuit is implemented in whole or in part using software, such software can be implemented to operate with a computing or processing system capable of carrying out the functionality described with respect thereto, such as computer system 800.

As used herein, the term "or" may be construed in either an inclusive or exclusive sense. Moreover, the description of resources, operations, or structures in the singular shall not be read to exclude the plural. Conditional language, such as, among others, "can," "could," "might," or "may," unless specifically stated otherwise, or otherwise understood within the context as used, is generally intended to convey that certain embodiments include, while other embodiments do not include, certain features, elements and/or steps.

Terms and phrases used in this document, and variations thereof, unless otherwise expressly stated, should be construed as open ended as opposed to limiting. Adjectives such as "conventional," "traditional," "normal," "standard," "known," and terms of similar meaning should not be construed as limiting the item described to a given time period or to an item available as of a given time, but instead should be read to encompass conventional, traditional, normal, or standard technologies that may be available or known now or at any time in the future. The presence of broadening words and phrases such as "one or more," "at least," "but not limited to" or other like phrases in some instances shall not be read to mean that the narrower case is intended or required in instances where such broadening phrases may be absent.

What is claimed is:

1. A non-transitory machine-readable storage media storing instructions that, when executed by a processor, cause the processor to:
retrieve a plurality of performance data associated with a system running a programming model;
execute an iterative control loop mechanism using the retrieved plurality of performance data;
determine when an optimization state is achieved based on the results of the iterative control loop mechanism, wherein executing the iterative control loop mechanism comprises running one or more layer-specific optimization functions at each layer of a plurality of hierarchical layers of the programming model; and
run one or more consolidation optimization functions to consolidate optimization results from different layers of the programming model;
wherein running the one or more layer-specific optimization functions at each layer of the plurality of hierarchical layers comprising the system and running the one or more consolidation optimization functions to consolidate optimization results from different layers comprises:
define a weight vector comprising a weight value associated with each of a plurality of plasticity parameters;
define a cost function comprising a Lagrangian sum of the weight vector and an objective function associated with an identified programming model;
initialize each plasticity parameter;
run the identified programming model based on the initialized plasticity parameters;
compute a first cost function based on the initialized plasticity parameters;
calculate a derivative of the first cost function;
subtract the calculated derivative from the initialized plasticity parameters to determine a second set of values for the plasticity parameters;
compute a second cost function based on the second set of values for the plasticity parameters; and
compare the second cost function and the first cost function.

2. The machine-readable storage media of claim 1, wherein the programming model comprises an algorithms layer, a toolchain layer, a runtime layer, and a hardware layer, and wherein the different layers comprise the algorithms layer, the toolchain layer, the runtime layer, and the hardware layer.

3. The machine-readable storage media of claim 1, wherein the performance data includes execution time, power utilization, power drawing, memory usage, utilization efficiency, or temperature sensor readings.

4. The machine-readable storage media of claim 1, wherein optimization of an algorithm layer is implemented on an application-by-application basis.

5. The machine-readable storage media of claim 1, wherein optimization of an algorithm layer is performed on all applications of the programming model at the same time.

6. The machine-readable storage media of claim 1, wherein optimization of a runtime layer is performed by adjusting configuration parameters for a given application.

7. A computer-implemented method comprising:
retrieving a plurality of performance data associated with a system running a programming model;
executing an iterative control loop mechanism using the retrieved plurality of performance data;
determining when an optimization state is achieved based on the results of the iterative control loop mechanism, wherein executing the iterative control loop mechanism comprises running one or more layer-specific optimization functions at each layer of a plurality of hierarchical layers of the programming model; and
running one or more consolidation optimization functions to consolidate optimization results from different layers of the programming model;
wherein running the one or more layer-specific optimization functions at each layer of the plurality of hierarchical layers of the programming model comprises:
defining a weight vector comprising a weight value associated with each of a plurality of plasticity parameters;
defining a cost function comprising a Lagrangian sum of the weight vector and an objective function associated with an identified programming model;
initializing each plasticity parameter;

running the identified programming model based on the initialized plasticity parameters;

computing a first cost function based on the initialized plasticity parameters;

calculating a derivative of the first cost function;

subtracting the calculated derivative from the initialized plasticity parameters to determine a second set of values for the plasticity parameters;

computing a second cost function based on the second set of values for the plasticity parameters; and comparing the second cost function and the first cost function.

8. The computer-implemented method of claim 7, wherein the programming model comprises an algorithms layer, a toolchain layer, a runtime layer, and a hardware layer, and wherein the different layers comprise the algorithms layer, the toolchain layer, the runtime layer, and the hardware layer.

9. The computer-implemented method of claim 7, wherein the performance data includes execution time, power utilization, power drawing, memory usage, utilization efficiency, or temperature sensor readings.

10. The computer-implemented method of claim 7, wherein optimization of an algorithm layer is implemented on an application-by-application basis.

11. The computer-implemented method of claim 7, wherein optimization of an algorithm layer is performed on all applications of the programming model at the same time.

12. The computer-implemented method of claim 7, wherein optimization of a runtime layer is performed by adjusting configuration parameters for a given application.

* * * * *